(12) United States Patent
Torfs et al.

(10) Patent No.: US 11,342,995 B2
(45) Date of Patent: May 24, 2022

(54) COMMUNICATION SYSTEM FOR RADIO TRANSMISSION

(71) Applicants: UNIVERSITEIT GENT, Ghent (BE); IMEC VZW, Leuven (BE)

(72) Inventors: Guy Torfs, De Pinte (BE); Piet Wambacq, Leuven (BE)

(73) Assignees: UNIVERSITEIT GENT, Ghent (BE); IMEC VZW, Leuven (BE)

(*) Notice: Subject to any disclaimer, the term of this patent is extended or adjusted under 35 U.S.C. 154(b) by 0 days.

(21) Appl. No.: 17/283,706

(22) PCT Filed: Oct. 8, 2019

(86) PCT No.: PCT/EP2019/077269
§ 371 (c)(1),
(2) Date: Apr. 8, 2021

(87) PCT Pub. No.: WO2020/078781
PCT Pub. Date: Apr. 23, 2020

(65) Prior Publication Data
US 2021/0384976 A1  Dec. 9, 2021

(30) Foreign Application Priority Data
Oct. 15, 2018 (EP) .................................... 18200559

(51) Int. Cl.
*H04B 10/2575* (2013.01)
*H04B 10/25* (2013.01)
*H04B 10/2507* (2013.01)

(52) U.S. Cl.
CPC ....... *H04B 10/25752* (2013.01); *H04B 10/25* (2013.01); *H04B 10/2507* (2013.01); *H04B 10/2575* (2013.01)

(58) Field of Classification Search
None
See application file for complete search history.

(56) References Cited

U.S. PATENT DOCUMENTS 7,463,905 B1   12/2008   Smiley et al.
10,143,041 B2  11/2018   Hori et al.
(Continued)

FOREIGN PATENT DOCUMENTS

EP   1161044 A2   12/2001
EP   2337242 A1    6/2011
(Continued)

OTHER PUBLICATIONS

International Search Report and Written Opinion from PCT Application No. PCT/EP2019/077269, dated Nov. 8, 2019.
(Continued)

*Primary Examiner* — Darren E Wolf
(74) *Attorney, Agent, or Firm* — Workman Nydegger

(57) ABSTRACT

A communication system includes a base station, at least one remote radio head, and at least one channel. The base station has at least two digital modulators adapted for modulating a first and a second incoming radio signal to obtain a first and a second quantized signal, a multiplexer for interleaving the quantized signals, and a transmitter adapted for transmitting the resulting quantized signal over the channel to the remote radio head. The remote radio head includes a receiver adapted for capturing the quantized signal, a clock extraction module adapted for converting the signal from the receiver into a clock signal, a demultiplexer for splitting the quantized signal using the clock signal to obtain at least two quantized signals, and a filter adapted for removing quantization noise from the quantized signal from the receiver or the demultiplexer.

15 Claims, 5 Drawing Sheets

(56) References Cited

U.S. PATENT DOCUMENTS

| | | | | |
|---|---|---|---|---|
| 2011/0135308 A1* | 6/2011 | Tarlazzi | .............. | H04J 14/0252 |
| | | | | 398/79 |
| 2011/0223958 A1* | 9/2011 | Chen | .................... | H04B 7/0617 |
| | | | | 455/522 |
| 2014/0050212 A1* | 2/2014 | Braz | ................. | H04W 72/0453 |
| | | | | 370/343 |
| 2014/0355991 A1* | 12/2014 | Cameirao | .............. | H04B 10/27 |
| | | | | 398/79 |
| 2015/0229397 A1* | 8/2015 | Shibata | ............ | H04B 10/25753 |
| | | | | 398/115 |
| 2017/0034716 A1* | 2/2017 | Dortschy | .............. | H04W 24/02 |
| 2018/0139802 A1 | 5/2018 | Hori et al. | | |

FOREIGN PATENT DOCUMENTS

| | | |
|---|---|---|
| EP | 2408160 A1 | 1/2012 |
| WO | 2016174805 A1 | 11/2016 |

OTHER PUBLICATIONS

Extended Search Report from corresponding EP Application No. 18200559.5, dated Mar. 22, 2019.
Wu et al., "Real-Time 4x3.5 Gbps Sigma Delta Radio-over-Fiber for a Low-Cost 5G C-RAN Downlink," 2018 European Conference on Optical Communication (ECOC), Sep. 23-27, 2018, pp. 1-3.

\* cited by examiner

COMMUNICATION SYSTEM FOR RADIO TRANSMISSION

FIELD OF THE INVENTION

The invention relates to the field of communication systems. More specifically it relates to communication systems for sending a radio signal between a base station and a remote antenna unit.

BACKGROUND OF THE INVENTION

A recent trend in mobile communication systems is to centralize base-station processing following the Cloud-Radio Access Networks (C-RAN) paradigm. This allows sharing of resources and coordination between different mobile cells which are served by remote radio heads (RRH). This sharing is essential to realize a cost effective and power efficient mobile communication networking when anticipating the expected increase in antenna heads. The interconnection between the centralized base-station and the RRH requires high-bandwidth and little latency. For this, optical fiber transmission is employed. Different solutions exist to transport radio signals over fiber and can be divided in two groups: digital radio over fiber (DRoF) and analog radio over fiber (ARoF).

ARoF directly modulates the radio signal on fiber and at the RRH only an optional up conversion and power amplification are required. As such a compact, standard agnostic and low power RRH can be realized. However, compared to classical fiber optics communication, radio signals require a very high linearity and low noise demanding specialized components. To modulate the wireless signals on an optical carrier, modulators with a high dynamic range are required. It is, they should add only little noise and should be sufficiently linear to ensure the wireless signal is not distorted. Typically, Mach Zehnder modulators or direct modulation of Distributed Feedback (DFB) lasers is employed. Both are expensive photonic devices.

ARoF can be done at the required RF frequency or at a lower IF frequency. If modulated at the RF frequency, only optical to electrical conversion is required at the remote antenna and the optical channel can be incorporated in the overall channel the system encounters, hence similar equalization techniques already used in wireless systems can be reused to remove fiber imperfections. If a lower IF frequency is used, an up-conversion stage is still required at the remote antenna. The latter will increase the difficulty of antenna synchronization.

Nowadays, the common solution is to transmit radio signals in a digital form (DRoF). The common public radio interface (CPRI) is employed to transmit radio signals from the basestation towards the RRH. This DRoF protocol transmits serialized I/Q samples which makes it very bandwidth inefficient, prohibiting further scaling towards higher bandwidths. To alleviate this problem a next version of the protocol, enhanced-CPRI or eCPRI is proposed. To reduce the bandwidth overhead, again some of the basestation functionality is pushed towards the RRH. As such, additional complexity is added to the RRH. In CPRI timestamping of the data is used to enable synchronization. However, only limited timing accuracy is obtained in the order of tens of nanoseconds. The disadvantage of this solution is that significant processing is required at the antenna side. Furthermore, synchronization of different antennas is difficult, which complicates Massive MIMO scenarios.

A big advantage of ARoF (without an up conversion step) compared to DRoF, is that the signals are transmitted phase synchronous. I.e. the phase of the wireless signal is directly related to the phase of signal at the basestation. This enables new wireless transmission approaches such as distributed beamforming and distributed Massive MIMO. Also, for other wireless systems, besides mobile communication systems, these techniques can be advantageous. For example, distributed radar systems in car bumpers would eliminate the typical near-far problem and would allow wide angle radars. However, the carrier frequency of ARoF transmission is limited due to bandwidth limitations of optical modulators. To increase the carrier frequency, an additional up conversion stage is required. This stage requires a local oscillator which will deteriorate the phase coherency.

Photonic up conversion allows to split the data modulation of the optical carrier from the carrier modulation. Two light tones are generated with a frequency spacing equal to the wanted RF carrier. One of them is modulated and both are combined at a photo diode, resulting in a modulated RF signal (due to the quadratic photodiode response). The carrier signal is generated at the basestation and is phase synchronous. The main difficulty is the need for proper carrier generation. Optical Phase Locked Loops (PLLs) can be a solution but are still in exploratory phase. Another solution is the modulation of an optical carrier with an RF carrier, generating the necessary spectral tones in the optical domain. Using filters, they can be separated, and one can be modulated with the data signal.

In view of the above, there is a need for good communication systems between a centralized base station and a remote radio head.

SUMMARY OF THE INVENTION

It is an object of embodiments of the present invention to provide a good communication system for radio transmission and a multiple input, multiple output system comprising such a communication system.

The above objective is accomplished by a method and device according to the present invention.

In a first aspect embodiments of the present invention relate to a communication system for radio transmission. The communication system comprises a base station, at least one remote radio head, and at least one channel.

The base station comprises at least two digital modulators. A first digital modulator which is adapted for modulating a first incoming radio signal to obtain a first quantized signal and a second digital modulator which is adapted for modulating a second incoming radio signal to obtain a second quantized signal.

A multiplexer for interleaving the first quantized signal and the second quantized signal to obtain a quantized signal.

A transmitter adapted for transmitting the quantized signal over the channel to the remote radio head.

The remote radio head comprises a receiver adapted for capturing the quantized signal, a clock extraction module adapted for receiving the signal from the receiver and for generating a clock signal phase synchronous to the received signal, a demultiplexer adapted for splitting the quantized signal using the clock signal to obtain at least two quantized signals, and a filter adapted for removing quantization noise from the quantized signal from the receiver or from a quantized signal from the demultiplexer to obtain at least one filtered signal.

Thus, a radio signal is obtained which can be transmitted using an antenna.

It is an advantage of embodiments of the present invention that at the remote radio head only filtering is required to reconstruct the signal. This signal is generated with a clock signal at the base station. The phase of this clock signal can be extracted at the RRH and can be used to synchronize a local oscillator signal to up convert the radio signal and/or to split the quantized signal into at least two quantized signals.

It is an advantage of embodiments of the present invention that a frequency up conversion is done at the remote radio head (RRH). This allows to have an incoming radio signal at an IF frequency or even at zero IF.

It is an advantage of embodiments of the present invention that a digital signal is transmitted over the channel. Since the signal is digital, low-cost components can be used for transmitting and receiving the signal over the channel.

At the receiver side, the clock frequency of the modulated stream (e.g. sigma delta modulated) can be extracted using a typical clock and data recovery (CDR) circuit to obtain a frequency synchronous signal that can be used for up and down conversion. The signal can be used directly or can be changed to a more appropriate frequency using a PLL.

The obtained signal at the output of the mixer or demultiplexer may be transmitted using an antenna. In case of multiple RRHs and multiple antenna's all transmitted signals have the same frequency. This is achieved because all clocks are extracted from the quantized signal coming from the base station. Thus, a clock frequency can be obtained which is frequency synchronous with the transmitted signal.

The multiplexer is adapted for interleaving the first quantized signal and the second quantized signal to obtain the quantized signal for the transmitter.

It is an advantage of embodiments of the present invention that different quantized signals can be woven together into a single quantized signal.

In embodiments of the present invention the remote radio head comprises the demultiplexer, wherein the demultiplexer is adapted for splitting the quantized signal using the clock signal to obtain two quantized signals, and at least two filters adapted for filtering the quantization noise from the quantized signals to obtain the filtered signals.

In embodiments of the present invention the clock extraction module is adapted for receiving the signal from the receiver and for converting it into an in-phase and a quadrature clock signal, and the mixer is adapted for upconverting the filtered signals using the in-phase and the quadrature clock signals to obtain the first and the second radio signal.

It is an advantage of embodiments of the present invention that a clock signal is present at the RRH. This allows to split the quantized signal in separate signals. One signal may for example comprise the odd bits whereas the other signal comprises the even bits.

The first incoming radio signal may be an in-phase radio signal and the second incoming radio signal may be a quadrature radio signal. In that case a zero-IF architecture is obtained wherein two sigma-delta streams are intertwined and transmitted simultaneously. At the RRH they are split and used as In-phase and Quadrature input for a zero-IF transmitter.

Such a communication system can also be used to address multiple antennas in the RRH, where different sigma delta streams are multiplexed and demultiplex again at the RRH.

In embodiments of the present invention the modulator is a sigma delta modulator.

In embodiments of the present invention the sigma delta modulator has two discrete levels.

When the sigma delta modulator has two discrete levels the quantized signal is an on-off keying (OOK) non-return-to-zero (NRZ) signal.

In embodiments of the present invention the sigma delta modulator has four discrete levels.

When the sigma delta modulator has four discrete levels the quantized signal is a PAM4 signal.

In embodiments of the present invention the channel is an optical channel.

It is an advantage of embodiments of the present invention that non-linear optical modulators (e.g. standard optical components) can be used instead of advanced analog modulators. Thanks to the sigma delta modulated stream non-linear effects of optical modulators are mitigated.

It is an advantage of embodiments of the present invention that standard optical components can be used. This results in cheaper systems compared to systems where advanced analog modulators are required and allows to follow standardization trends of datacom applications.

In embodiments of the present invention the remote radio head comprises a delay element adapted for delaying the quantized signal.

Thanks to the digital nature of the modulated signal (e.g. sigma delta signal), it can be delayed easily. As such, an electric true time delay can be implemented. This is an important feature to enable large antenna arrays as it mitigates beam squinting.

The sigma delta stream has discrete levels (e.g. 2 resulting in NRZ or 4 when using PAM4 transmission). As such, it can be easily delayed using flipflops. This allows to realize electrical true time delays with high resolution (e.g. 40 ps when 25 GSps sigma delta modulation is used). This could be very beneficial for supporting large antenna arrays.

In embodiments of the present invention the remote radio head comprises a resampling module adapted for resampling the quantized signal before passing it to the filter.

It is an advantage of embodiments of the present invention that jitter and noise on the quantized signal can be reduced by the resampling module.

In embodiments of the present invention the remote radio head comprises an antenna adapted for transmitting the radio signal which it receives from the mixer or demultiplexer.

In embodiments of the present invention a power amplifier may be used for amplifying the radio signal from the mixer or demultiplexer before passing it to the antenna.

In embodiments of the present invention the communication system comprises a return path. This return path comprises the following components at the remote radio head:

an upstream mixer adapted for downconverting a return signal using the clock signal to obtain a downconverted signal, and an upstream transmitter adapted for transmitting the downconverted signal over the channel.

The return path comprises an upstream receiver adapted for capturing the downconverted signal at the base station.

It is an advantage of embodiments of the present invention that the clock signal can also be used to down convert a received signal phase synchronously. A down converted signal can be filtered more easily to remove interferers and as such reduced linearity requirements of the upstream path are obtained.

In embodiments of the present invention the communication system comprises an upstream antenna adapted for receiving the return signal and for passing it to the upstream mixer. In embodiments of the present invention the upstream path has a similar architecture as the downstream path (e.g.

at least one wireless signal coming from an antenna is downconverted with a mixer, the downconverted signal is filtered using a low pass filter, and the filter signal is quantized using a SDM, after which it may be delayed using a delay module, and after which it may be linearly combined with one or more other signals coming from a different antenna/SDM).

In embodiments of the present invention a low noise amplifier may be used for amplifying the antenna signal before passing it to the mixer.

In a second aspect embodiments of the present invention relate to a multiple input multiple output system comprising a communication system in accordance with embodiments of the present invention. The communication system comprises a plurality of channels and a plurality of remote radio heads. Each remote radio head is adapted for capturing the quantized signal from the base station and transmitted over the channel to which the remote radio head is connected.

It is an advantage of embodiments of the present invention that synchronous radio signals are generated by the mixers of the remote radio heads as they are all using a clock signal which is extracted from the quantized signal from the base station.

In embodiments of the present invention the multiple input multiple output system is adapted to adjust the delay for each of the remote radio heads in function of the connected channel.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
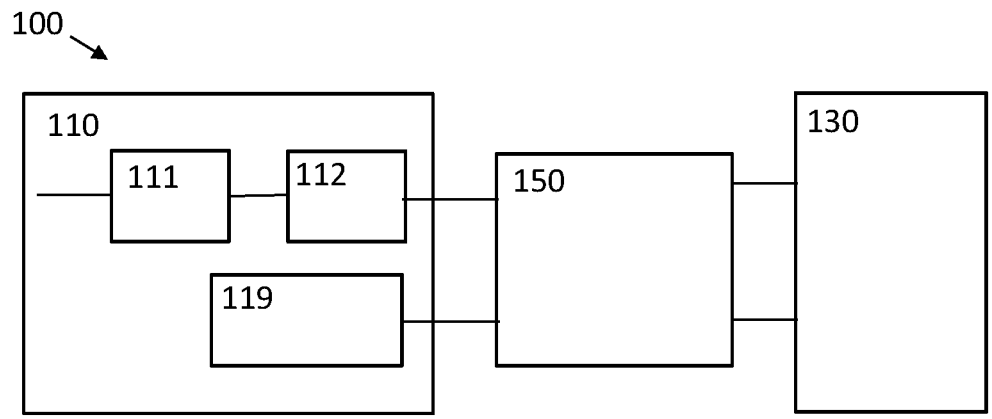
FIG. 1 shows a schematic drawing of an exemplary communication system in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

In a first aspect embodiments of the present invention relate to a communication system 100 for radio transmission. Such a system comprises a base station 110, at least one remote radio head 130, and at least one channel 150 between the base station 110 and the remote radio head 130.

In embodiments of the present invention the base station 110 comprises at least two digital modulators 111a, 111b. A first digital modulator 111a which is adapted for modulating a first incoming radio signal to obtain a first quantized stream and a second digital modulator 111b which is adapted for modulating a second incoming radio signal to obtain a second quantized stream (e.g. having 2 levels or 4 levels). This digital modulators 111a, 111b may for example be sigma delta modulators. The carrier frequency may be oversampled at least two times. For mm-wave applications, e.g. with a transmission of 28 GHz this implies that a sampling frequency of at least 56 Gbaud/s is required. Since the obtained signal is digital, low cost components can be used.

The base station 110 comprises multiplexer 113 for interleaving the first quantized signal and the second quantized signal to obtain a quantized signal.

The base station 110 moreover comprises a transmitter 112 adapted for transmitting the quantized signal over the channel 150.

The remote radio head (RRH) 130 comprises a receiver 131 adapted for capturing the quantized signal. The signal can be reconstructed by filtering the quantization noise (e.g. sigma delta noise). The RRH therefore comprises a filter 133 which is adapted for removing quantization noise from the quantized signal. This quantized signal may be directly coming from the receiver 131 or it may be coming from a demultiplexer 135 which first demultiplexes the quantized signal which comes from the receiver.

The RRH 130 comprises a clock extraction module 132 adapted for receiving the signal from the receiver 131 and for converting it into a clock signal. The phase of this clock signal can be extracted at the RRH 130 and can be used to synchronize a local oscillator signal to up convert the radio signal.

The quantized signal from the receiver may for example be a sigma delta modulated stream and the clock frequency of the sigma delta modulated stream may be extracted using a typical clock and data recovery (CDR) circuit to obtain a phase synchronous signal that can be used for up and down conversion. The signal can be used directly or can be changed to a more appropriate frequency using a PLL.

The RRH comprises a demultiplexer 135. The demultiplexer 135 is adapted for splitting the quantized signal using the clock signal to obtain at least two quantized signals. The RRH may comprise a mixer which is adapted for upconverting the filtered signal using the clock signal from the clock extraction module.

The CDR can also resample the quantized signal (e.g. the sigma delta stream). Doing so, it removes induced jitter and noise and cleans up the transmitted signal. This is not possible with ARoF. The impairments of an analog signal can only be removed after the signal is demodulated.

Thanks to the digital nature of the quantized signal (e.g. the sigma delta signal), it can be delayed easily. As such, an electric true time delay can be implemented. This is an important feature to enable large antenna arrays as it mitigates beam squinting.

For example, a sigma delta stream has discrete levels (e.g. 2 resulting in NRZ or 4 when using PAM4 transmission). As such, it can be easily delayed using flipflops. This allows to realize electrical true time delays with high resolution (e.g. 40 ps when 25 GSps sigma delta modulation is used). This could be very beneficial for supporting large antenna arrays.

In a communication system according to embodiments of the present invention typically the required bandwidth is less than CPRI and more than eCPRI.

The clock signal can also be used to down convert a received signal phase synchronously at the remote radio head. A down converted signal can be filtered more easily to remove interferers and as such reduced linearity requirements of the upstream path are obtained.

Thanks to the sigma delta modulated stream non-linear effects of optical modulators are mitigated.

Thanks to the sigma delta modulated stream non-linear effects of optical modulators are mitigated. It is therefore possible to use standard optical components, making it cheap and allowing it to follow standardization trends of Datacom applications.

FIG. 1 shows a schematic drawing of an exemplary communication system 100 in accordance with embodiments of the present invention. The communication system 100 comprises a base station 110 where a digital-representation of a low-IF radio signal is modulated using a digital modulator 111. This digital modulator may for example be a sigma delta modulator or a pulse width modulator. The resulting quantized signal is transmitted over a broadband channel 150 to a remote radio head (RRH) 130 using a transmitter 112. The broadband channel may be an optical or an electrical channel (e.g. fiber or wireline). In this exemplary embodiment of the present invention the base station 110 also comprises a receiver 119 adapted for receiving upstream data coming from the remote radio head 130 over the channel 150.

Figure 2:
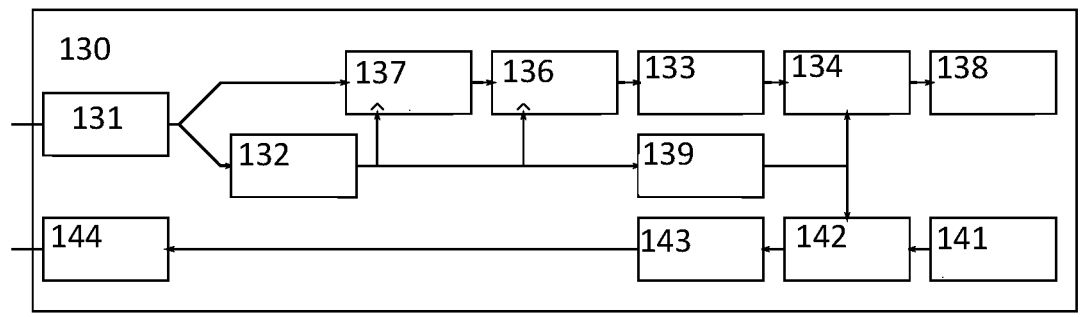
FIG. 2 and FIG. 3 show schematic drawings remote radio heads in accordance with embodiments of the present invention.

FIG. 2 shows a schematic drawing of an exemplary RRH 130 in accordance with embodiments of the present invention. This exemplary embodiment of the present invention comprises a receiver 131 which captures the signal from the channel 150, a clock extraction module 132, a filter 133 and a mixer 134. In this exemplary embodiment of the present invention the other components which are shown in FIG. 2 are optional but may be added to improve the performance.

The receiver 131 converts the modulated stream (e.g. sigma-delta) transmitted over the channel 150 into a processable shape. For example, for fiber transmission, the receiver 131 may comprise a photodiode and a broadband transimpedance amplifier. In case of fiber transmission, the receiver 131 may optionally also comprise an equalizer and limiting amplifier.

The signal generated from the receiver 131 is provided to a clock extraction module 132. This function can for example be implemented using a PLL-based CDR. A typical phase detector (e.g. BangBang) of a CDR also performs data recovery. This is illustrated by the resampling module 137 in FIG. 2. As such, the jitter and amplitude noise is removed from the signal. Next, the signal is filtered by the filter 133 to remove the quantization noise (e.g. sigma delta quantization), thereby restoring the analog signal. The filter 133 may for example be a lowpass filter.

The clock extraction module 132 is adapted for extracting the clock signal from the received signal.

In embodiments of the present invention the extracted clock signal may be used to up convert the filtered signal using a mixer 134 after which it may be amplified using a power amplifier (PA) 138 and transmitted with an antenna 138. If needed, the clock signal can first be processed by a PLL 139 to further remove jitter or to modify the frequency.

A return path is optional, In FIG. 2 a typical IF receiver consisting of an antenna 141, followed by a low noise amplifier 141, down-conversion using a mixer 142 and filtering using a (lowpass) filter 143 is drawn. The signal from the antenna and LNA 141 is mixed with a clock signal by the mixer 142 and the mixed signal is filtered by the filter 143. This signal can be transmitted back to the basestation using the transmitter 144. The same clock signal (generated from CDR and/or PLL) can be reused for the down-conversion to ensure a synchronous phase relation.

In embodiments of the present invention a delay line 136 may be included in the signal path to provide a fixed delay between the received signal at the receiver 131 and transmitted signal at the antenna 138. From this point up to the antenna the transmit path can be replicated to drive different antennas with a time-shifted version of the same radio signal. In this way beamforming can be implemented.

Figure 3:
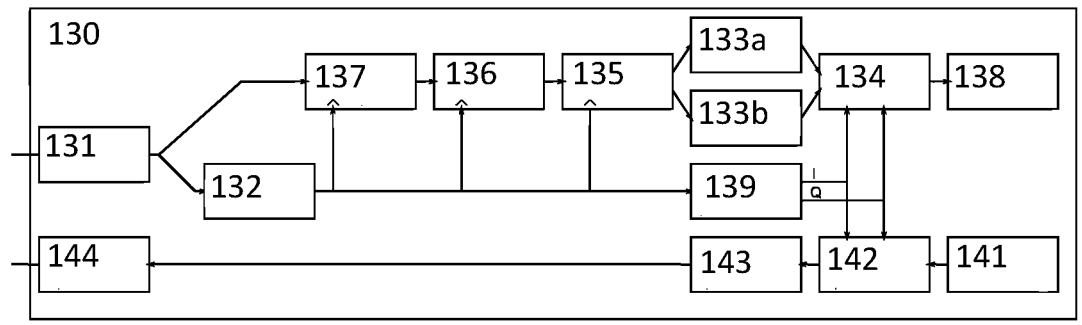

FIG. 3 shows another exemplary embodiment of a RRH 130 of a communication system 100 in accordance with embodiments of the present invention. In this schematic drawing a zero-IF architecture is shown. A RRH 130 is shown which is adapted for receiving two sigma-delta streams which are intertwined and transmitted simultaneously as a quantized signal. The RRH 130 comprises a receiver 131 for capturing the quantized signal. From the receiver the quantized signal is forwarded to a clock extraction module 132 where it is converted into a clock signal. This clock signal is used by a demultiplexer 135 which is adapted for splitting the quantized signal to obtain two quantized signals. These are filtered by the (lowpass) filters 133a and 133b. In embodiments of the present invention the quantized signals are used as In-phase and Quadrature input for a zero-IF transmitter. Optionally a PLL 139 may be used to remove jitter or to modify the frequency. The RRH in this exemplary embodiment of the present invention may comprise a mixer 134 for upconverting the signals from the filters 133a, 133b, however, this is not strictly necessary. This mixer uses the clock signal(s) for the up-conversion. The signal from the mixer or directly from the filters is transmitted by a power amplifier (optional) and antenna 138. The optional upstream path, in this exemplary embodiment of the present invention, comprises an LNA and antenna 141, a mixer 142 for down-converting the signal from the antenna 141 using the obtained clock signal(s), a (lowpass) filter 143, and a coherent transmitter 144 for transmitting the signal from the filter 143 over the channel.

Figure 4:
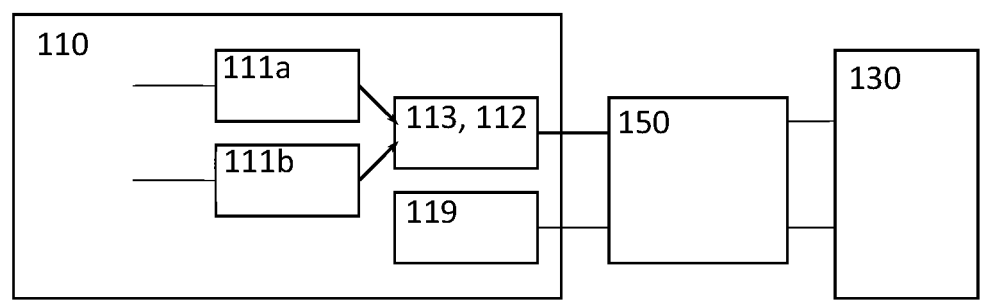
FIG. 4 shows an exemplary communication system in accordance with embodiments of the present invention of which a possible implementation of the remote radio head is illustrated in more detail in FIG. 3.

FIG. 4 shows an exemplary communication system 100 in accordance with embodiments of the present invention of which a possible implementation of the RRH 130 is illustrated in more detail in FIG. 3. The base station 110 in this example comprises two sigma delta modulators 111a, 111b. One for converting an in-phase radio signal and the other one for converting a quadrature radio signal. The base station moreover comprises a multiplexer 113 for interleaving the first quantized signal and the second quantized signal to obtain the quantized signal for the transmitter 112. The quantized signal is transmitted over the channel 150. In this exemplary embodiment of the present invention the base station 110 comprises a receiver 119 for the upstream path. This receiver 119 is optional.

In embodiments of the present invention two low-pass sigma delta streams may be weaved together. As such it is possible to transmit an I/Q signal stream by alternating bits of the I signal with bits of the Q signal.

Figure 5:
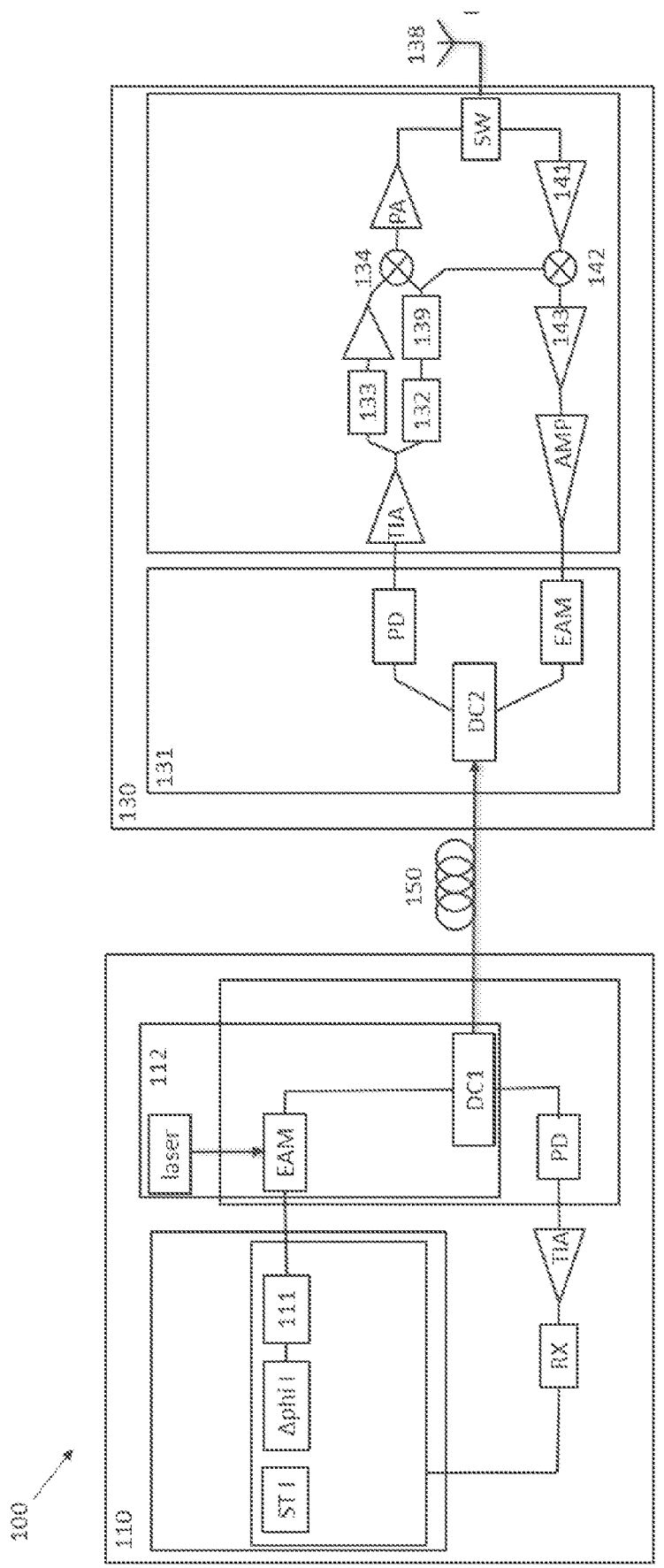
FIG. 5 shows a system architecture of a communication system in accordance with embodiments of the present invention.

FIG. 5 shows a system architecture of a communication system 100 in accordance with embodiments of the present invention. Intermediate Frequency (IF) sigma delta modulation is applied at the base station 110 and up-conversion is applied at the RRH 130.

In the base station an incoming radio signal (ST I) is phase shifted (Δphi I) and sigma delta converted by the sigma delta modulator 111. The phase shifter and sigma delta converter may for example be implemented using FinFET technology. The incoming signal may for example have an IF frequency below 3 GHz, or even below 300 MHz. The transmitter 112 comprises a laser. This may for example be 1550 nm laser at 10 dBm. An Electro-Absorption-Modulator (EAM) may be used for modulating the intensity of the laser beam from the laser. The EAM is thereby driven by a signal coming from the SDM 111. This may for example be a 200 mV or even a 2 V signal at 28 Gbps or even up to 112 Gbps. The output of the EAM is connected with the channel 150. In this example the connection is realized with a directional coupler DC1. The EAM, PD, and DC1 at the base station may be implemented using Silicon Photonics technology.

At the receive side the remote radio head 130 comprises a receiver 131 which is adapted for capturing the quantized signal. In this exemplary embodiment of the present invention the receiver comprises a directional coupler DC2 which receives the quantized signal and forwards it to a photodiode PD. The receiver 131 may be implemented using Silicon photonics technology.

The output signal of the photodiode (e.g. a 0.6 mA) signal is forwarded to a broadband transimpedance amplifier TIA and from the transimpedance amplifier the signal chain is split in two parallel paths. One path comprises a low pass filter 133 for removing the quantization noise. This may for example be a 10 MHz filter or even a 1 GHz filter. The signal after the filter is amplified. The other path comprises a clock extraction module 132 (CDR) which is adapted for generating a clock signal that is synchronized to the incoming signal into a clock signal. This obtained signal can be changed to a more appropriate frequency using a PLL 139 as is done in this exemplary embodiment of the present invention. The extracted clock signal is used to upconvert the filtered signal using the mixer 134 after which it is amplified using the power amplifier PA and connected to an antenna 138 using a switch SW. The advantage thereof is that the oversampling factor of the sigma delta convertor 111 is not depending on the RF carrier but can be limited to the factor that results in the S/N ratio which is desired for the broadband signal over the channel. Thus, a reduction in baud rate can be obtained.

The clock signal that is used to do the conversion is extracted from the quantized signal. This implies that it is frequency synchronous. Also, the phase can be related to the quantized signal. The phase of the up-conversion signal is only dominated by time delays of the optical link. The delays can be considered as a time delay in the complete channel. Whether it is in the optical channel or in the wireless part. This overall delay can be compensated by the same algorithm.

The exemplary embodiment of FIG. 5 also comprises a return path. From the antenna 138 the signal goes to the switch SW. In the return path the signal may be amplified using an LNA 141 after which it propagates to the mixer 142 where it is mixed with the extracted clock signal to obtain a downconverted signal. The mixed signal propagates to a bandpass filter (BPF) 143. After filtering, the signal is amplified by an amplifier AMP before it is forwarded to the EAM and to the directional coupler DC2 using which it is transmitted on the channel. At the base station side 110 the incoming signal is directed by the directional coupler DC1 to the photodiode PD, which converts the optical signal in an electrical signal. The electrical signal is amplified using a transimpedance amplifier TIA after which it can be received with a low-IF receiver RX.

The frequency conversion is synchronous with the signal from the base station. If multiple antennae are controlled they all can run at the same frequency. This is achieved by mixing with a clock signal which is obtained from the quantized signal coming from the base station using a clock extraction module.

In embodiments of the present invention the signal from the base station and the signals at the one or more different antennae may even be phase related.

The IF frequency may for example be 3 GHz and below or even 100 MHz and below. The SDM frequency may for example be 1 GHz or even 50 GHz. The invention is, however, not limited thereto.

Figure 6:
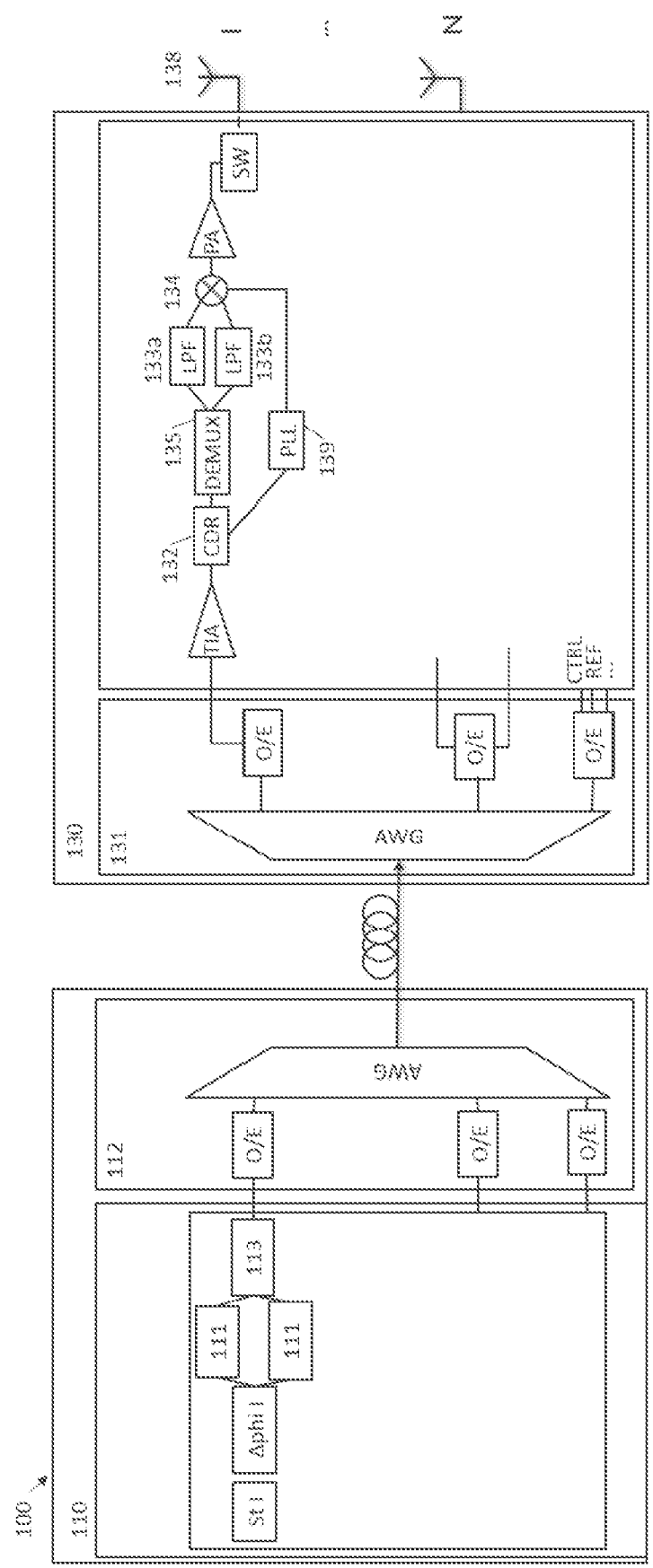
FIG. 6 shows a system architecture of a communication system in accordance with embodiments of the present invention wherein different streams are demultiplexed.

This technique could also be used to address multiple antennas in the RRH 130, where different modulated streams (e.g. sigma delta streams) are multiplexed and demultiplexed again at the RRH. As a clock is present at the RRH, the data can be demultiplexed. Thus 2 streams can be obtained. An example thereof is illustrated in FIG. 6. The incoming stream (ST I) is phase shifted and two parallel sigma delta converters 111 are creating two quantized signals which are interleaved by a multiplexer 113. In this exemplary embodiment of the present invention the transmitter 112 comprises electro optical converters O/E for converting quantized signals in an optical signal and an arrayed waveguide grating (AWG) which is used as an optical multiplexer and which transmits the multiplexed signal over the channel. At the RRH 130, a receiver 131 captures this multiplexed signal. The receiver 131 comprises an AWG which demultiplexes the signal and opto-electrical converters O/E. The output signal of such an opto-electrical convertor is amplified by a TIA after which it is converted into a clock and data signal by a clock and data recovery module 132. The quantized signal is demultiplexed using the clock signal to obtain two quantized signals which are filtered using low pass filters 133a, 133b. A mixer 134 may be present for upconverting the signals from the low pass filters. The clock from the clock and data recovery may be modified using a PLL 139. The output of the mixer may be amplified by a power amplifier PA which is connected with antenna using a switch SW. Also, a zero IF transceiver can be made.

Figure 7:
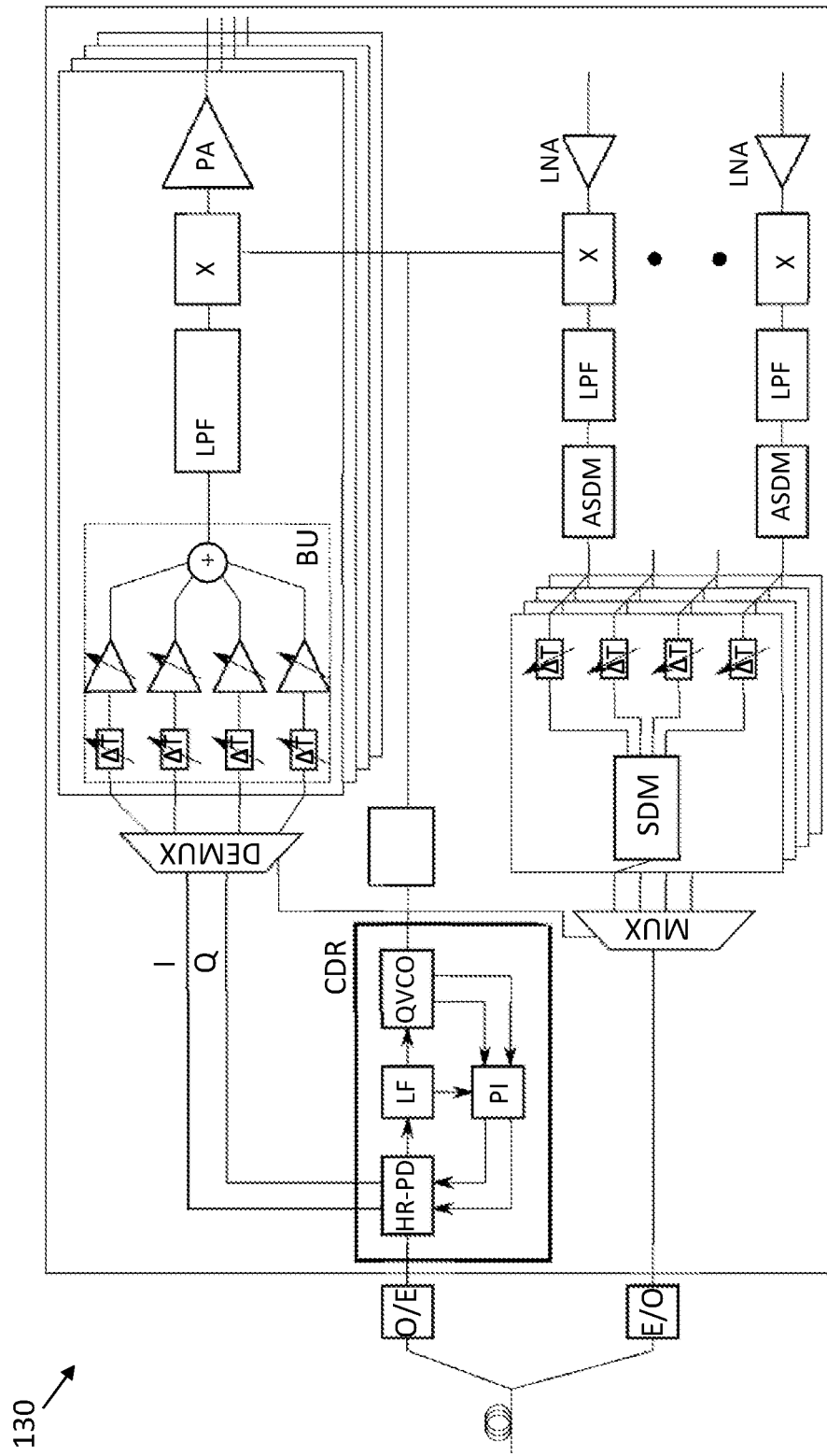
FIG. 7 shows an example of a non-linearity tolerant multi-user MIMO beamforming RRH in accordance with embodiments of the present invention.

An example of a non-linearity tolerant multi-user MIMO beamforming RRH in accordance with embodiments of the present invention is illustrated in FIG. 7. Multiple channels can be implemented as different sigma delta streams. The sigma delta streams can be demultiplexed and each of them can be easily delayed.

In the example implementation of FIG. 7, eight sigma-delta modulated streams representing the in-phase (I) and quadrature (Q) signals of four different users are interwoven before transmitting over a channel. The signals are interwoven on a bit basis in the following order $I_1 \, Q_1 \, I_2 \, Q_2 \, I_3 \, Q_3 \, I_4 \, Q_4$, where the subscript represent different users. At the RRH, the stream is received with an optical-to-electro (O/E) converter and provided to a clock-and-data recovery module. The clock-and-data recovery (CDR) module is implemented as a half rate CDR. The incoming data is sampled using a half-rate phase detector (HR-PD) which provides two output signals representing the in-phase sigma-delta streams (I-streams) of the different users and the quadrature sigma-delta streams (Q streams) of the different users. Besides, the HR-PD also provides timing information that steers a quadrature voltage-controlled oscillator (QVCO). The QVCO provides two clock signals, which are synchronized to the incoming data and are phase related with 90 degree. A loopfilter (LF) controls the dynamic behavior of the control loop. An optional phase interpolator (PI) is employed between in the loop to track fast variations in the phase of the incoming signal. It is an advantage of this topology that the control signal driving the QVCO can be reduced to optimize for jitter rejection, while the PI can be used to optimize jitter tolerance.

The I and Q signals are separated using a demultiplexer using the clock of the CDR, resulting in 8 different streams and provided to four different beamforming units (BU). As would be appreciated by someone skilled in the art, only the I channels are drawn in the beamforming unit to reduce the complexity of FIG. 7. The four I and four Q streams are individually delayed ($\Delta T$) and scaled before adding together.

It is an advantage of the embodiment that the streams are digital, as such, they can be easily delayed using capacitively-loaded inverters. The scaling and addition can be power efficiently implemented using a charge-pump based structure.

The added streams are low pass filtered (LPF) to remove the sigma-delta quantization noise and provided to a zero-IF mixer (X) for up conversion. The local oscillator for the mixer is derived from the CDR. Either the clock signal of the CDR is directly used, or the frequency is adapted using a PLL. After up conversion the signals can be amplified with a power amplifier PA and transmitted with an antenna.

It is an advantage of the embodiment that differently delayed, and linearly combined versions of the different streams can be provided to different antennae. This enables the construction of complex beamforming patterns required in multi-user MIMO scenarios.

The exemplary embodiment of FIG. 7 also contains an upstream path. In the upstream path, a similar architecture as in the downstream path is followed. The upstream path receives four wireless signals coming from four different antennae using four low noise amplifiers. Each of these signals is down converted with a zero-IF mixer (X) using the same local oscillator as the upstream mixer, resulting in four in-phase ($I_{RX}$) and four quadrature ($Q_{RX}$) baseband signals originating from the different received signals. Only the processing of the $I_{RX}$ signals is visualized to reduce the complexity of the figure. The processing of the $Q_{RX}$ signals is identical. The $I_{RX}$ are low pass filtered using a (tunable) lowpass filter (LPF) to remove interference. This reduces the required dynamic range of the further receiver chain. The filtered (analog) signals are quantized to a two-level signal using an asynchronous sigma-delta modulator (ASDM) or a pulse-width modulator.

The four two level signals are provided to four beamforming modules. Each of these modules delay ($\Delta T$) and linearly combine the four two-level signals from the antenna to generate four sigma-delta modulated streams which represent the signals from the different users.

It is an advantage of this embodiment that the resulting two-level received signals can be easily delayed using capacitively-loaded inverters.

The delayed versions of the two-level signals can be linearly combined in the first integrator of a continuous time sigma delta modulator (SDM) using charge-pumps. Due to the digital nature of the embodiments, low power implementations of the components are possible.

The output of the four continuous-time sigma delta modulators are interleaved with a multiplexer (MUX) and transmitted over the channel to the BBU with an electro-to-optical (E/O) convertor.

In the examples described above the clock signal is recovered from the quantized signal (e.g. the sigma delta signal). This clock signal may be used for up- and/or down-conversion and/or it may be used to split the datastream. When splitting the data-stream different datastreams are unwoven. This is specifically applicable for splitting I and Q data-streams. The invention is, however, not limited thereto.

It is an advantage of embodiments of the present invention that synchronization and multiplexing are enabled. This is achieved by using a quantized signal (e.g. a sigma delta modulated signal) as enabler for the synchronization. The quantized signal (e.g. the sigma delta modulated signal) thereby has the same advantages as transmitting an analog signal with the additional advantage the synchronization can be coupled to the signal. It is, moreover, advantageous that multi-stream can be implemented.

In the present invention no digital processing is required. Because the digital signal can be transmitted directly, no buffering is required. It is and advantage of embodiments of the present invention that a system is obtained that is transparent with the data phase.

In embodiments of the present invention it is also possible to transmit low IF. In that case bandpass filtering around IF may be implemented. It is thereby advantageous that easy up-conversion can be implemented.

In embodiments of the present invention the oversampling per stream must be high enough for the required signal to noise ratio. This required oversampling is depending on the order of the sigma delta modulator. For a second order modulator a factor of for example 16 or 32 may be used.

In a second aspect embodiments of the present invention relate to a multiple input multiple output system comprising a communication system 100 in accordance with embodiments of the present invention. The communication system 100 comprises a plurality of channels 150 and a plurality of remote radio heads 130 wherein each remote radio head 130 is adapted for capturing the quantized signal from the base station 110 and transmitted over the channel 150 to which the remote radio head 130 is connected.

By sending the quantized signal (e.g. sigma delta signal) all RRHs are running synchronous, because the quantized signal is used to lock all RRHs. This is particularly advantageous for MIMO because it allows to send synchronously different signals. Moreover, tuning is possible such that one signal can be delayed with respect to the other one. This allows for example to transmit signals from two different antenna's which are positioned at different locations such that constructive interference is possible at a third location. A communication system according to embodiments of the present invention may therefore be adapted to control the phases of the signals at the different antenna's to obtain interference at specified locations. This is particularly useful in distributed MIMO systems.

In embodiments of the present invention channel estimation can for example be done based on a reply from the end user. Based on this response the delays can be adjusted. The obtained channel characteristics may for example be stored in a matrix.

In embodiments of the present invention multiple streams may be present which can be split. Communication systems according to embodiments of the present invention may for example be adapted to obtain 4 different streams. Different signals for different users may thereby have a different delay. By loading with a capacitance the digital signal may for example be delayed. In embodiments of the present invention a linear combination of four signals may be put on an antenna. It may also be possible that 4 different linear combinations are put on 4 different antenna's.

Communication systems according to embodiments of the present invention may be deployed in different applications such as 4G and 5G front-haul applications, indoor high-speed networking applications, and distributed radar systems.

The invention claimed is:

1. A communication system for radio transmission, the communication system comprising a base station, at least one remote radio head, and at least one channel,
   wherein the base station comprises:
   at least two digital modulators, a first digital modulator which is adapted for modulating a first incoming radio signal to obtain a first quantized signal and a second digital modulator which is adapted for modulating a second incoming radio signal to obtain a second quantized signal,
   a multiplexer for interleaving the first quantized signal and the second quantized signal to obtain a quantized signal,
   a transmitter adapted for transmitting the quantized signal over the channel to the remote radio head which comprises:
   a receiver adapted for capturing the quantized signal,
   a clock extraction module adapted for receiving the quantized signal from the receiver and for converting it into a clock signal,
   a demultiplexer adapted for splitting the quantized signal using the clock signal to obtain at least two quantized signals,
   a filter adapted for removing quantization noise from the quantized signal from the receiver or from a quantized signal of the at least two quantized signals from the demultiplexer to obtain at least one filtered signal.

2. The communication system according to claim 1, the communication system, moreover, comprising a mixer adapted for upconverting the at least one filtered signal using the clock signal.

3. The communication system according to claim 2, wherein the remote radio head comprises at least two filters adapted for filtering the quantization noise from the quantized signals to obtain the filtered signals.

4. The communication system according to claim 3, wherein the clock extraction module is adapted for receiving the quantized signal from the receiver and for converting it into an in-phase and a quadrature clock signal, and
   wherein the mixer is adapted for upconverting the filtered signals using the in-phase and the quadrature clock signals to obtain the first and the second radio signal.

5. The communication system according to claim 1, wherein the modulators are sigma delta modulators.

6. The communication system according to claim 5, wherein the sigma delta modulators have two discrete levels.

7. The communication system according to claim 5, wherein the sigma delta modulators have four discrete levels.

8. The communication system according to claim 1 wherein the channel is an optical channel.

9. The communication system according to claim 1 wherein the remote radio head comprises a delay element adapted for delaying the quantized signal.

10. The communication system according to claim 1 wherein the remote radio head comprises a resampling module adapted for resampling the quantized signal before passing it to the filter.

11. The communication system according to claim 2 wherein the remote radio head comprises an antenna adapted for transmitting the radio signal from the mixer or the demultiplexer.

12. The communication system according to claim 1, the communication system comprising a return path with at the remote radio head:
   an upstream mixer adapted for downconverting a return signal using the clock signal to obtain a downconverted signal, and
   an upstream transmitter adapted for transmitting the downconverted signal over the channel back to the base station which comprises:
   an upstream receiver adapted for capturing the downconverted signal.

13. The communication system according to claim 12, the communication system comprising an upstream antenna adapted for receiving the return signal and for passing it to the upstream mixer.

14. A multiple input multiple output system comprising a communication system in accordance with claim 1,
   wherein the communication system comprises a plurality of channels and a plurality of remote radio heads,
   wherein each remote radio head has the structure of the at least one remote radio head in claim 1,
   wherein each remote radio head is adapted for capturing the quantized signal from the base station and transmitted over the channel to which the remote radio head is connected.

15. The multiple input multiple output system according to claim 14, wherein each of the remote radio heads of the communication system comprises a delay element adapted for delaying the quantized signal and wherein the multiple input multiple output system is adapted to adjust the delay for each of the remote radio heads as a function of the channel to which said remote radio head is connected.

\* \* \* \* \*